United States Patent
Natsume (10) Patent No.: US 8,155,825 B2
(45) Date of Patent: Apr. 10, 2012

(54) ON-VEHICLE DATABASE DISTRIBUTION NODE AND ON-VEHICLE DATABASE SYSTEM

(75) Inventor: Akihiro Natsume, Yokkaichi (JP)

(73) Assignees: Autonetworks Technologies, Ltd., Mie (JP); Sumitomo Wiring Systems, Ltd, Mie (JP); Sumitomo Electric Industries, Ltd., Osaka (JP)

( * ) Notice: Subject to any disclaimer, the term of this patent is extended or adjusted under 35 U.S.C. 154(b) by 1063 days.

(21) Appl. No.: 11/991,936

(22) PCT Filed: Oct. 12, 2006

(86) PCT No.: PCT/JP2006/320377
§ 371 (c)(1),
(2), (4) Date: Mar. 13, 2008

(87) PCT Pub. No.: WO2007/043608
PCT Pub. Date: Apr. 19, 2007

(65) Prior Publication Data
US 2009/0138136 A1    May 28, 2009

(30) Foreign Application Priority Data
Oct. 12, 2005    (JP) .................................. 2005-298206

(51) Int. Cl.
*G06F 7/00* (2006.01)
(52) U.S. Cl. ...................................................... 701/34.4
(58) Field of Classification Search .............. 701/29–36, 701/1, 34.4
See application file for complete search history.

(56) References Cited

U.S. PATENT DOCUMENTS
6,128,560 A * 10/2000 Ishii ................................ 701/29
6,360,152 B1    3/2002 Ishibashi et al.

FOREIGN PATENT DOCUMENTS
| JP | A 2000-284808 | 10/2000 |
| JP | A 2002-204249 | 7/2002 |
| JP | A 2005-159568 | 6/2005 |
| WO | WO 99/22494 A1 | 5/1999 |

* cited by examiner

*Primary Examiner* — Yonel Beaulieu
(74) *Attorney, Agent, or Firm* — Oliff & Berridge, PLC (57) ABSTRACT

A on-vehicle database system includes: a memory for recording an on-vehicle database connected to an on-vehicle LAN network and to an ECU for registering data inputted from respective ECU as attribute value data all at once; and data output means for registering data in the on-vehicle database when the data is inputted via I/O means and outputting the data to the ECU at the timing when the data is required by the ECU, by using the attribute value data in the on-vehicle database.

7 Claims, 7 Drawing Sheets

| IDENTIFICATION INFORMATION (ID) | ATTRIBUTE VALUE DATA (D) |
|---|---|
| WHEEL SPEED (IDa) | ○○○ [rpm] (Da) |
| STERRING ANGLE (IDb) | ○○× [deg] (Db) |
| NUMBER OF ROTATIONS OF ENGINE (IDc) | ○×△ [rpm] (Dc) |
| ⋮ | ⋮ |
| OIL TEMPERATURE (IDn) | 40 [°C] (Dn) |
| ⋮ | ⋮ |

Fig. 3

| IDENTIFICATION INFORMATION (ID) | OUTPUT TIMING (Ti) | PARAMETER (Par) |
|---|---|---|
| WHEEL SPEED (IDa) | OUTPUT AT CHANGE TIME | NO THINNING (Para) |
| STERRING ANGLE (IDb) | OUTPUT AT TIME IN EXCESS OF THRESHOLD | EVERY ±5 DEGREES (Parb) |
| OIL TEMPERATURE (IDn) | OUTPUT AT PREDETERMINED INTERVAL | EVERY ONE SECOND (Parc) |
| ⋮ | ⋮ | ⋮ |

ON-VEHICLE DATABASE DISTRIBUTION NODE AND ON-VEHICLE DATABASE SYSTEM

TECHNICAL FIELD

The present invention relates to an on-vehicle database distribution node and an on-vehicle database system and more particularly to an on-vehicle database distribution node and an on-vehicle database system capable of optimizing communication to decrease a communication load factor and suppress an increase of the consumption ratio of the resource of each portion.

BACKGROUND ART

In recent years, owing to an increase in the function of a car, the number (number of nodes) of electronic control units (ECU) mounted on the car tends to increase. When the electronic control units are connected to one another by means of a vehicle control network (hereinafter referred to as merely on-vehicle LAN), the number of nodes connected with the on-vehicle LAN increases, and the amount of data to be communicated also increases. But there is a limitation in the number of nodes that can be connected with one on-vehicle LAN and in the amount of data that can be processed by each ECU. Thus the on-vehicle LAN connected with the ECU is divided into some segments to decrease the communication load factor of each segment.

Figure 5:
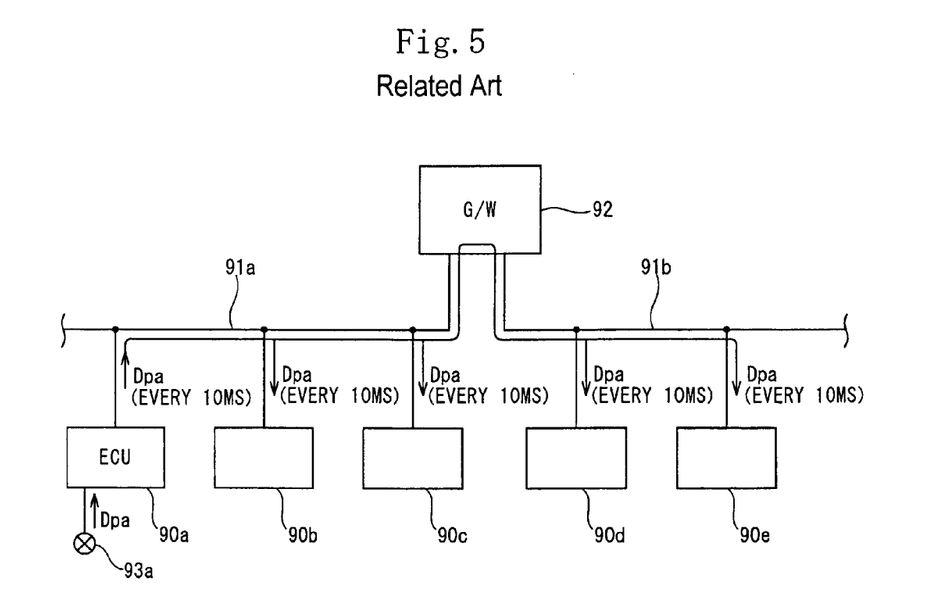
FIG. 5 shows the construction of a conventional communication system provided among electronic control units connected with a LAN network.

A communication system shown in FIG. 5 is so constructed that a plurality of electronic control units 90a through 90c, . . . is connected to one another with a bus 91a of an on-vehicle LAN conforming to a CAN (Controller Area Network), that a plurality of electronic control units 90d through 90e, . . . are connected to one another with a bus 91b of another on-vehicle LAN conforming to the CAN (Controller Area Network), and that by connecting both buses 91a and 91b to each other with a gateway 92, various data can be communicated among the electronic control units 90a through 90e, . . . .

That is, data Dpa indicating measured values and states obtained by a sensor 93a connected with one ECU 90a are outputted to the electronic control units 90a through 90c disposed inside the bus 91a at intervals of 10 ms or the like. The ECU 90b requiring the data Dpa outputted to the bus 91a receives the data Dpa at the intervals of 10 ms.

Because the data Dpa is relayed to the bus 91b by the gateway 92, the ECU 90e disposed inside the bus 91b is capable of receiving the data Dpa.

Because in recent years, the amount of data to be communicated between the buses 91a and 91b tends to increase, the on-vehicle LAN such as FlexRay (registered trademark), MOST (Media Oriented Systems Transport), and D2B (Domestic Digital Bus) having a sufficient traffic is used as the buses 91a and 91b.

Figure 6:
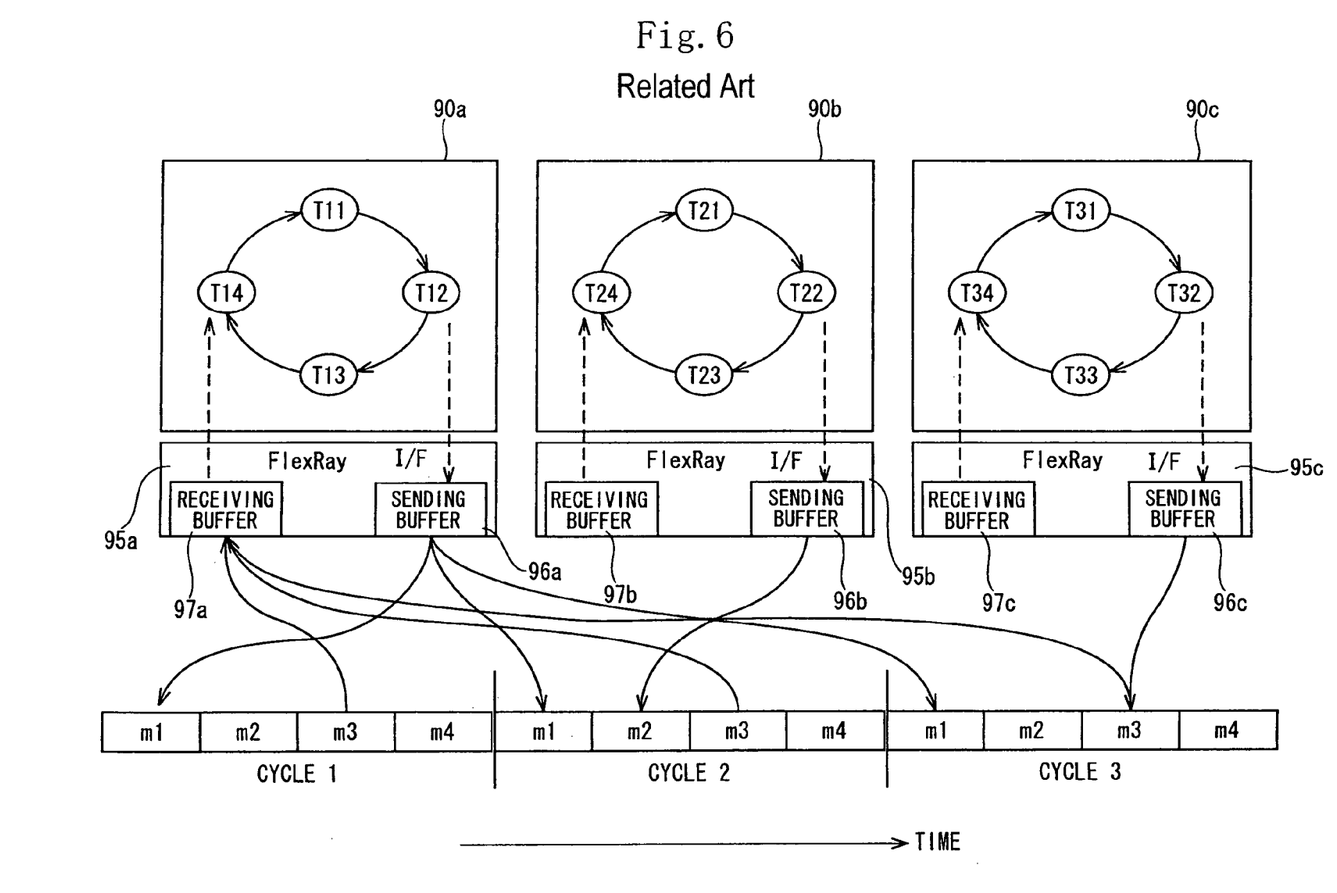
FIG. 6 shows the construction of a conventional communication system, using FlexRay, which is provided among electronic control units.

As shown in FIG. 6, the on-vehicle LAN conforming to the FlexRay is managed to prevent a collision from occurring by synchronizing communication timings with one another, even though the amount of data increases.

FIG. 6 conceptually shows the state of communication at the time when communication is performed in conformity to the FlexRay. The electronic control units 90a through 90c have FlexRay communication means 95a through 95c respectively. Each of the FlexRay communication means 95a through 95c has sending buffers 96a through 96c and receiving buffers 97a through 97c respectively. Each of the electronic control units 90a through 90c sends data disposed inside the sending buffers 96a through 96c to a bus (not shown) of the FlexRay at timings m1 through m3 fixed during the communication cycle, thereby preventing the occurrence of collision and collision-caused transmission delay of data.

In Japanese Patent Application Laid-Open No. 2005-159568 (patent document 1), there is described a construction in which when a sending timing is delayed by a transmission error or the like, data is securely sent in the order from the ID having a higher priority to prevent much transmission delay in the case of ID having a high priority even in a state where a communication load factor is high.

Patent document 1: Japanese Patent Application Laid-Open No. 2005-159568

DISCLOSURE OF THE INVENTION

Problem to be Solved by the Invention

Figure 7:
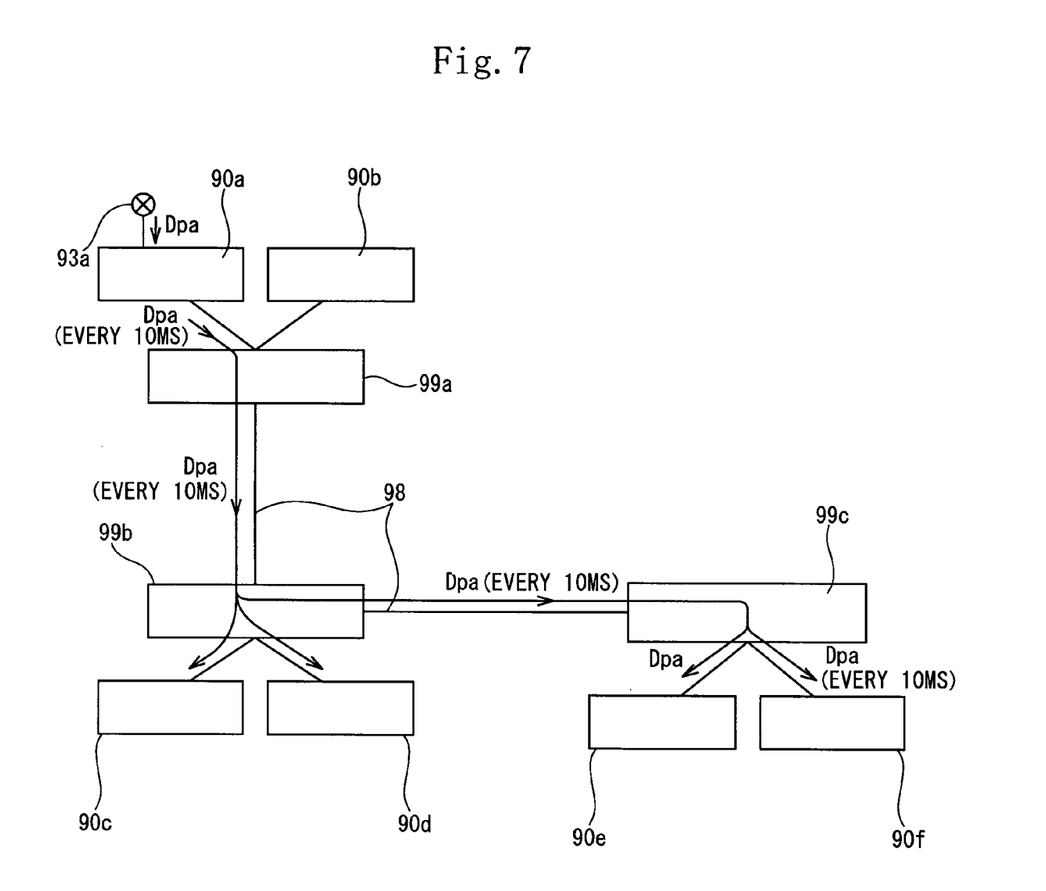
FIG. 7 shows the construction of a communication system logically connecting a plurality of electronic control units with one another with a trunk line capable of performing high-speed communication.

The on-vehicle LAN has a multi-cast construction. Thus each of the electronic control units 90a, . . . executes processing of receiving all the communicated data Dpa. Therefore the resource thereof is wastefully consumed. That is, as shown in FIG. 7, even in the case where on-vehicle hubs 99a through 99c which execute high-speed communication by using a bus 98 of the on-vehicle LAN conforming to the standard of the FlexRay or the like are interposed between the electronic control units 90a through 90f, the on-vehicle hub connected with the electronic control units 90a, . . . requiring the data Dpa . . . relay all the data Dpa, . . . . Thus processing for receiving the data Dpa, . . . unnecessary for most (or all electronic control units in dependence on a timing) of the electronic control units 90a . . . is executed. Therefore the resource of each of the electronic control units 90a, . . . is wastefully consumed. Consequently it is necessary to allow the resource of each of the electronic control units 90a, 90b, . . . to cope with an increase of the amount of communicated data.

In addition, as shown in FIG. 6, even when a bus such as FlexRay for executing synchronous communications is used, at each of the electronic control units 90a through 90c, each task processing T11 through T34 for sending and receiving data via the communication means 95a through 95c is executed. There occurs a delay in a timer for managing the task processing T11 through T34. Consequently the task processing is not in time for timing m1, m2, . . . , which may cause a delay in the transmission of the data. Therefore data to be sent accumulates in the sending buffers 96a through 96c, which causes a delay in control executed by using this accumulated data and a stress to be imparted to each of the electronic control units 90a through 90c. As the number of logic connections among the electronic control units 90a through 90c becomes larger, the generation of such a stress becomes increasingly serious. There is a fear that this problem will become far more serious owing to an increase of the function of the car.

Further in the on-vehicle LAN constituting the above-described conventional multi-cast construction, even though an interval of about one second is sufficient for the data Dpa required by the ECU at the data receiving side, when the ECU 90a at the data sending side sends the data Dpa at the interval of 10 ms, the data Dpa is sent at an interval of 10 ms through all related buses 91a, 91b, and 98. Thereby the communication load factor of the buses 91a, 91b, and 98 increases. The higher is the communication load factor, the higher is the possibility that a delay occurs in the data transmission owing to the generation of collision.

The present invention has been made in view of the above-described problems. It is an object of the present invention to provide an on-vehicle database distribution node and an on-vehicle database system capable of efficiently using electronic control units each having a limited resource by optimizing transmission of data among electronic control units so that the transmission of necessary attribute data can be accomplished at a sufficiently high speed, delay little occurs in the transmission of the data, and the communication load factor of an on-vehicle LAN network can be reduced.

Means for Solving the Problem

To solve the above-described problems, the present invention provides an on-vehicle database distribution node having:

an input/output means for inputting data thereto from electronic control units connected therewith and outputting data to the electronic control units;

a memory for registering data inputted thereto from the electronic control units in an on-vehicle database together as attribute value data; and a data output means for outputting necessary data to one of the electronic control units at a timing required thereby by using the attribute value data registered in the on-vehicle database, the above-described one of the electronic control units being different from the electronic control units which have inputted the attribute value data to the on-vehicle database.

The on-vehicle database distribution node of the present invention may have a plurality of the input/output means for inputting data from the electronic control units and outputting data thereto.

When the on-vehicle database distribution node inputs the data from the ECU, the data can be registered as the attribute value data in the on-vehicle database disposed inside the memory. Herein the registration includes initial registration of the attribute value data and in addition registration of renewal (namely, updating) to a newest attribute value data. The data includes measured values of various portions of a vehicle and the state of the vehicle. The attribute value data may be data to be inputted to the ECU and outputted therefrom or data optimized by compression or standardization of a format to register the optimized data in the on-vehicle database.

The data output means outputs the attribute value data in the on-vehicle database to the ECU at the timing required by other ECU. Thus the ECU connected with the on-vehicle database distribution node is capable of obtaining the necessary data. When it is unnecessary to input data to the ECU each time it is updated although the data is required, the data can be inputted to the ECU at only a set timing. Thus the resource thereof is not wastefully consumed.

It is preferable that an on-vehicle database distribution node includes:

on-vehicle LAN communication means, connected with one another via an on-vehicle LAN network, for sending and receiving the attribute value data;

an input/output means for inputting data from other on-vehicle database distribution nodes and outputting data thereto; and an on-vehicle database synchronizing means for recording the attribute value data corresponding to data inputted thereto via the input/output means in the on-vehicle database inside the memory, sending the attribute value data to an on-vehicle LAN network via the on-vehicle LAN communication means, and registering the attribute value data in the on-vehicle database, when the on-vehicle database synchronizing means receives the attribute value data from the on-vehicle LAN network via the on-vehicle LAN communication means.

As described above, in the present invention, it is preferable to connect a plurality of the on-vehicle database distribution nodes with one another via the on-vehicle LAN communication means.

Some of the on-vehicle LAN networks have a plurality of segments connected with one another with a gateway, an on-vehicle hub, and the like. To minimize a delay period of time, it is preferable that the on-vehicle LAN network is composed of a real-time Ethernet (registered trademark), FlexRay, MOST, D2B, IDB1394, and a single segment of the on-vehicle LAN formed by using an industrial LAN. These on-vehicle LAN networks are capable of accomplishing sufficiently high-speed communication.

The input/output means of the on-vehicle database distribution node may be a communication means or an interface for inputting and outputting various data or may be the on-vehicle LAN communication means connected with a segment of the on-vehicle LAN conforming to the specification of CAN (Controller Area Network), FlexRay or the like. That is, a plurality of electronic control units may be connected with the input/output means or a segment such as a bus of another on-vehicle LAN may be connected with the input/output means.

The on-vehicle database distribution node connected with the on-vehicle LAN network has the on-vehicle database synchronizing means. Thereby the attribute value data registered in the on-vehicle database is sent to the on-vehicle LAN network via the on-vehicle LAN communication means, and the attribute value data is registered in the on-vehicle database when the attribute value data is received from the on-vehicle LAN network via the on-vehicle LAN communication means. That is, the on-vehicle databases can be synchronized with one another.

To minimize the delay period of time, it is preferable that the on-vehicle database synchronizing means sends the attribute value data inputted thereto from the ECU to other on-vehicle database distribution nodes as soon as possible and that by forming the on-vehicle database synchronizing means of a hardware, the attribute value data to be inputted thereto can be sent to the on-vehicle LAN network. When the attribute value data inputted to the on-vehicle database synchronizing means to register the attribute value data in the on-vehicle database is identical to a content already registered in the on-vehicle database, it is possible to omit the synchronization.

That is, the on-vehicle database synchronizing means compares the data inputted thereto with data based on the attribute value data recorded in the on-vehicle database inside the memory. When both data are different from each other, the on-vehicle database synchronizing means may output the updated attribute value data to the on-vehicle LAN network to decrease the communication load factor of the on-vehicle LAN network. In addition, to use the on-vehicle LAN network efficiently, the on-vehicle database synchronizing means may be so constructed that each time each attribute value data is updated, the on-vehicle databases are not synchronized with one another, but synchronization is periodically performed by updating of each on-vehicle database.

It is preferable that in the memory, an output timing setting table is recorded where identification information for identifying the attribute value data to be outputted and a data output timing when data based on the attribute value data is outputted are set and that the on-vehicle database distribution node further comprising an output timing setting means for inputting output demands from the electronic control units via the input/output means and for updating the output timing setting table in accordance with the output demands.

In the above-described construction, when the output demand is inputted to the on-vehicle database distribution node from the ECU, the output timing setting means rewrites the output timing setting table. Thereby it is possible to dynamically set the output timing of the data to be outputted from the data output means to the ECU.

It is preferable that a timing when a specified attribute value data changes can be set as the data output timing; and when a change is detected in the attribute value data set to be outputted at the timing when the attribute value data changes during monitoring of the on-vehicle database, the data output means immediately outputs data based on the attribute value data.

In the above-described construction, the output timing at the change time can be set in the output timing setting table. Thus each time the predetermined attribute value data is updated, the updated attribute value data can be outputted immediately. That is, when the ECU at the data supply side updates data in the on-vehicle database distribution node, the data output means of other on-vehicle database distribution node connected with the on-vehicle LAN network immediately outputs the updated data to the ECU which requires it. Therefore the data can be exchanged between the ECU at the data supply side and the ECU at the data receiving side at a real time, namely, in one-to-one communication. It is possible to set the number of thinning times in the timing of the change-time output and receive data frequently updated at the ECU at a timing required thereby.

It is preferable that a timing when a specified attribute value data exceeds a predetermined threshold can be set as the data output timing; and when the attribute value data to be outputted at the timing when the attribute value data exceeds the predetermined threshold exceeds the threshold during monitoring of the on-vehicle database, the data output means immediately outputs data based on the attribute value data.

In the above-described construction, when the attribute value data exceeds the predetermined threshold set in the output timing setting table, the data output means outputs data based on the attribute value data to the ECU. The threshold may be one value or a plurality of thresholds constituting breakpoints may be set so that when the attribute value data exceeds the thresholds (when attribute value data crosses thresholds), the data may be outputted.

It is preferable that the data output means inputs real-time output demands from the electronic control units via the input/output means and immediately outputs data in response to the real-time output demands.

In the above-described construction, at the timing when the real-time output demand is inputted to the data output means from the ECU, the data output means immediately outputs data based on the attribute value data registered in the on-vehicle database to the ECU.

The present invention provides an on-vehicle database system having:

an on-vehicle database distribution node including an input/output means for inputting data from electronic control units connected therewith and outputting data to the electronic control units; a memory for registering data inputted thereto from the electronic control units in an on-vehicle database together as attribute value data; and a data output means which by using the attribute value data registered in the on-vehicle database, outputs necessary data to one of the electronic control units at a timing required thereby; and a communication means for connecting the on-vehicle database distribution node and electronic control units with each other, wherein data received from each of the electronic control units connected with the on-vehicle database distribution node is registered in the on-vehicle database; and by using the on-vehicle database, data can be provided to each of the electronic control units.

In the on-vehicle database system having the above-described construction, data outputted from one ECU to one on-vehicle database distribution node is registered as the attribute value data in the on-vehicle database of the on-vehicle database distribution node, and data required by other ECU can be outputted at the timing required thereby. Thus the other ECU is capable of receiving the attribute value data. Consequently at a desired timing, the other ECU is capable of receiving the necessary data outputted from one ECU.

The present invention provides an on-vehicle database system including: a plurality of on-vehicle database distribution nodes; and an on-vehicle LAN network for connecting the on-vehicle database distribution nodes with one another, wherein data received from electronic control units connected with the on-vehicle database distribution nodes respectively is registered in an on-vehicle database; and by using the on-vehicle database, data can be provided to each of the electronic control units.

In the on-vehicle database system having the above-described construction, data outputted from one ECU to one on-vehicle database distribution node is registered as the attribute value data in the on-vehicle database of the on-vehicle database distribution node, and the on-vehicle databases of other on-vehicle database distribution nodes connected with one another with the on-vehicle LAN network are synchronized with one another by the on-vehicle database synchronizing means and renewedly registered in the newest state. Thus data required by other ECU connected with other on-vehicle database distribution node can be outputted to the other ECU at a timing required thereby, and the other ECU is capable of receiving the attribute value data.

Consequently of a plurality of data outputted from one ECU, the other ECU connected with other on-vehicle database distribution node is capable of receiving data required thereby at a timing required thereby.

Effect of the Invention

As described above, in the on-vehicle database distribution node of the present invention, the ECU connected with the on-vehicle database distribution node is capable of receiving necessary data at a necessary timing. That is, the electronic control units connected with the on-vehicle database distribution node are easily capable of obtaining data from the ECU connected with the on-vehicle database distribution node by connecting the electronic control units with one on-vehicle database distribution node constituting the on-vehicle database system without being conscious of the state of communication between the electronic control units and the ECU (ECU at data supply side) constituting the data output source and without being conscious of the on-vehicle LAN network for connecting the ECU at the data supply side and the electronic control units with each other.

The data based on the attribute value data inside the on-vehicle database is outputted to the ECU at the timing required thereby. Thus each of the electronic control units connected with the on-vehicle database distribution node is capable of inputting the necessary attribute value data at only a timing required thereby. Therefore the ECU does not wastefully consume the resource at the electronic control unit side. Further it is possible to greatly reduce the communication load factor of the communication line connecting the ECU and the on-vehicle database distribution node with each other.

When a plurality of the on-vehicle database distribution nodes is connected with one another via the on-vehicle LAN communication means connected with the on-vehicle LAN network, it is possible to easily obtain data from the electronic control units connected with all of the on-vehicle database distribution nodes via the input/output means.

When the identification information for identifying the attribute value data to be outputted in accordance with the output demand inputted from the ECU and the timing when data based on the attribute value data is outputted are set, the ECU connected with the on-vehicle database distribution node is capable of receiving specified necessary data at a necessary interval by setting the identification information desired to be outputted and the output timing in the output timing setting table.

In the case where the timing when the specified attribute value data changes can be set as the data output timing, the ECU does not receive the data so long as the attribute value data does not change. Thus it is possible to reduce the communication load factor to a much higher extent than the case where unnecessary data is frequently outputted to the ECU and prevent wasteful consumption of the resource of each portion, because wasteful data input operations are not performed.

In the case where the timing when the specified attribute value data exceeds the predetermined threshold can be set as the data output timing, the ECU does not receive the data so long as the attribute value data does not change. Thus it is possible to reduce the communication load factor to a much higher extent than the case where unnecessary data is outputted to the ECU and prevent the wasteful consumption of the resource of various portions of a vehicle, because wasteful data input operations are not performed.

When the data output means immediately outputs data in response to the input of the real-time output demand from the ECU, the data output means is capable of immediately outputting data based on the attribute value data registered in the on-vehicle database. Therefore the ECU connected with the on-vehicle database distribution node is capable of easily obtaining the newest data at a desired timing and does not need to wait for data sent from a data supply side ECU unlike the conventional art. That is, it is possible to decrease a load applied to the ECU in processing signals.

In the on-vehicle database system of the present invention, of a plurality of data outputted from each of electronic control units connected with the on-vehicle database distribution node, data required by other ECU can be provided at a timing required thereby. Therefore communication can be efficiently accomplished among respective portions. Thus it is possible to reduce the communication load factor of each portion and prevent wasteful consumption of the resource of each portion.

When a plurality of the on-vehicle database distribution nodes is connected with one another, of a plurality of data outputted from each of electronic control units connected with one of the on-vehicle database distribution nodes, data required by the ECU connected with a given other on-vehicle database distribution node can be provided at a timing required thereby. Therefore communication can be efficiently accomplished among respective portions. Thus it is possible to reduce the communication load factor of each portion and prevent wasteful consumption of the resource of each portion.

That is, the ECU at the data supply side updates data at predetermined intervals in the on-vehicle database. All the electronic control units are capable of receiving the updated data if necessary. If unnecessary, the electronic control units do not receive the updated data. Thereby it is unnecessary to execute signal processing relating thereto. Thus the construction of the present invention is capable of utilizing the resource of the ECU more efficiently than the conventional construction of always transmitting newest data. Further because unnecessary communication is not made, the communication load factor of each portion decreases.

EXPLANATION OF REFERENCE NUMERALS AND SYMBOLS

1: on-vehicle database system
2(2a, 2b, . . . ): ECU
4(4a, 4b, . . . ): on-vehicle database distribution node
5: on-vehicle LAN network
7: on-vehicle database
10: on-vehicle LAN communication means
11: input/output means
12: memory
D(Da, Db, . . . ): data
Pa: on-vehicle database synchronizing means
Pb: data output means
Pc: output timing setting means
T: output timing setting table

BEST MODE FOR CARRYING OUT THE INVENTION

The embodiments of the present invention are described below with reference to the drawings.

Figure 1:
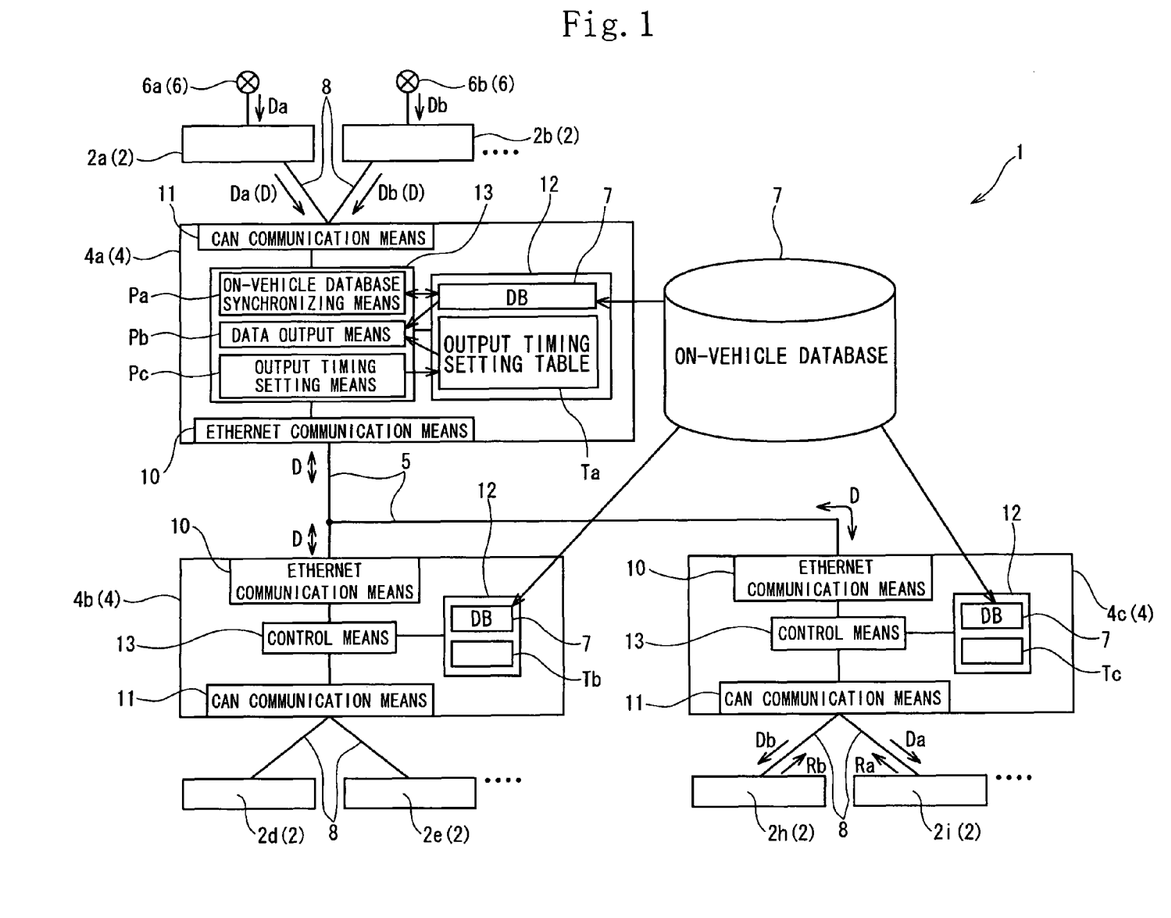
FIG. 1 shows the construction of an on-vehicle database system of a first embodiment of the present invention.
Figure 2:
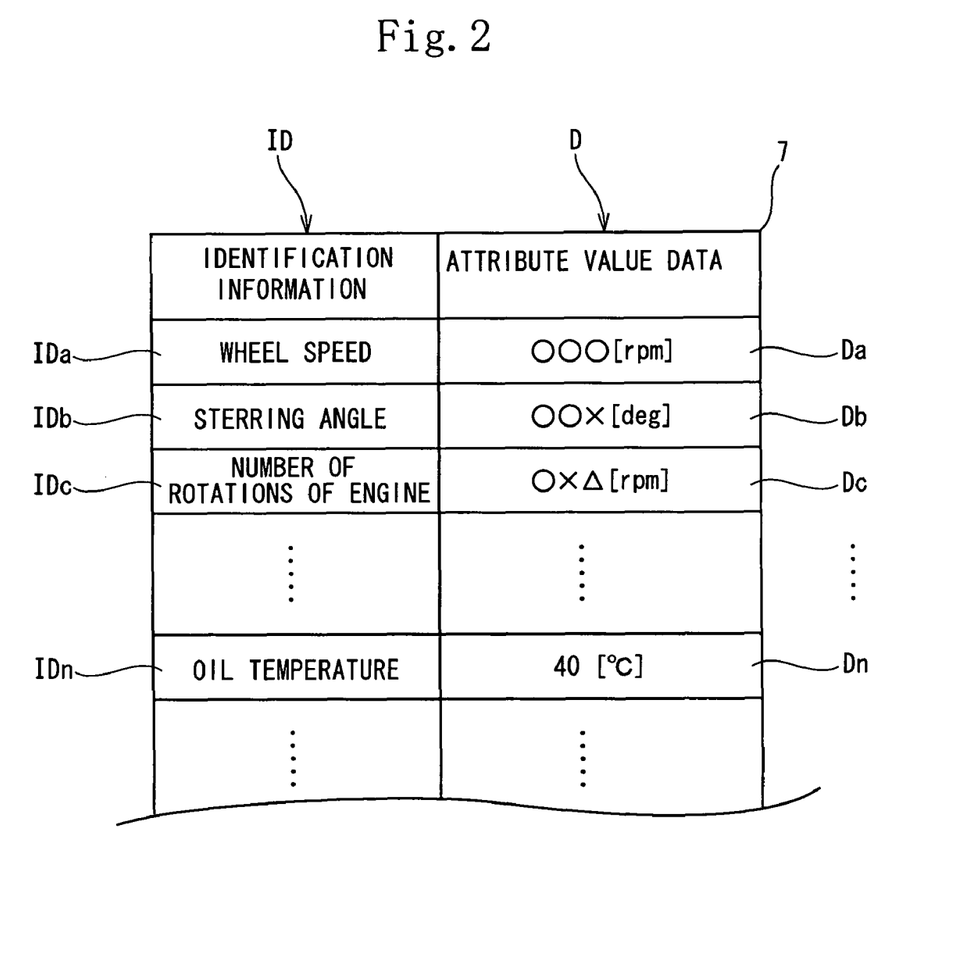
FIG. 2 shows an example of an on-vehicle database.
Figure 3:
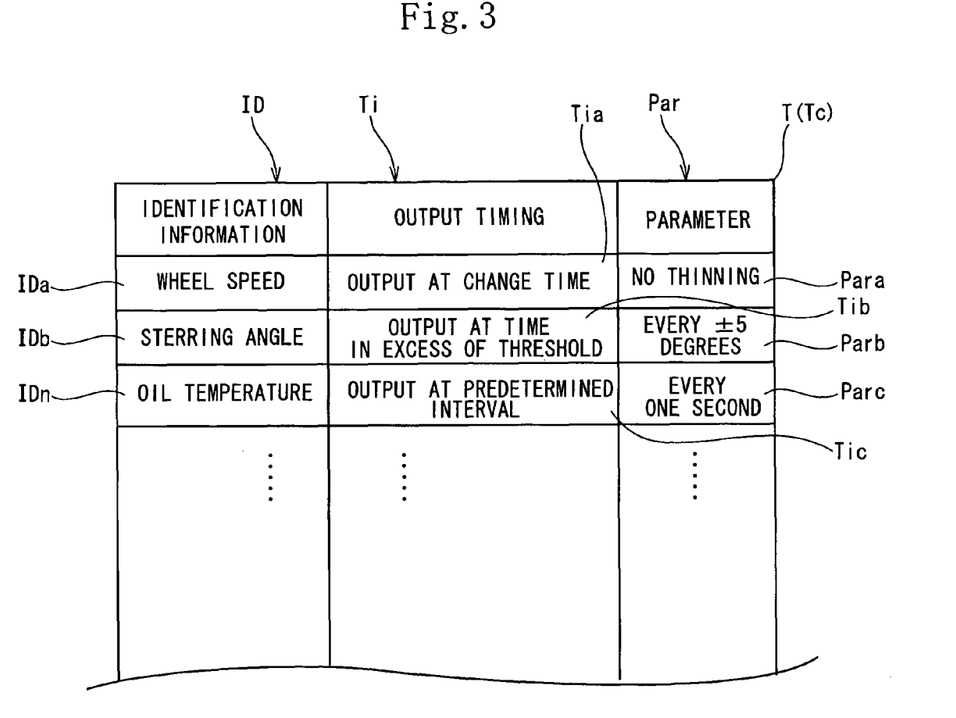
FIG. 3 shows an example of an output timing setting table.

FIGS. 1 through 3 show the construction of an on-vehicle database system 1 of the first embodiment of the present invention. In the first embodiment, a plurality of on-vehicle database distribution nodes is connected with one another via an on-vehicle LAN network.

In the on-vehicle database system 1 shown in FIGS. 1, 2(2a, 2b, . . . ) denote electronic control units disposed at various portions of a vehicle; 4(4a through 4c) denote the on-vehicle database distribution nodes connected with a group of electronic control units 2a . . . , 2d, . . . , 2h . . . ; and 5 denotes the on-vehicle LAN network connecting the on-vehicle database distribution nodes 4 with one another. 6(6a, 6b . . . ) denote sensors connected with the electronic control units 2a, 2b, . . . respectively and outputting data D(Da, Db, . . . ) of the state of the vehicle and measured values of various physical quantities thereof.

In the on-vehicle database system 1, each on-vehicle database distribution node 4 has a function of recording an on-vehicle data base 7 in which the data D obtained from all the sensors 6 is registered together as attribute value data and of distributing the content of the on-vehicle data base 7 to each ECU 2a, . . . .

In the first embodiment, as the attribute value data D inside the on-vehicle data base 7, data received from the ECU is used without processing it.

FIG. 1 shows the construction of the on-vehicle database system 1 briefly shown to describe the present invention. Thus in the on-vehicle database system 1 of the present invention, the number of the on-vehicle database distribution nodes 4, the disposition thereof, the number of the electronic control units 2 connected with an optical transceiver, and the disposition thereof are not limited to those shown in FIG. 1.

The electronic control unit 2 controls candidates connected therewith and has the function of outputting the data D measured by the various sensors 6 so that the data D can be utilized by other electronic control units 2.

In the first embodiment, the ECU 2a for controlling the braking of the vehicle is connected with the wheel speed sensor 6a detecting the rotation of wheels. The wheel speed sensor 6a releases braking temporarily when the output (wheel speed which is an example of the attribute value data Da) of the wheel speed sensor 6a becomes zero at a braking time and executes control of preventing tires from being locked and transmits the wheel speed Da to the on-vehicle LAN network 5 so that other electronic control units 2i, . . . execute the control thereof respectively by using the wheel speed Da.

Similarly the ECU 2b has a function of controlling the steering of the vehicle. The ECU 2b is so constructed as to control the steering of the vehicle by using a steering angle as the attribute value data Db outputted from the steering angle sensor 6b and transmit the steering angle Db to the on-vehicle LAN network 5 so that other electronic control units 2h, . . . execute control thereof respectively by using the steering angle Db. The function of the other ECU 2c and that of the sensor 6c are as described above and the description thereof is omitted herein.

The on-vehicle database distribution node 4 is a hub (on-vehicle hub) connected with the on-vehicle LAN network 5 and sending and receiving various data at a high speed. The on-vehicle LAN network 5 is a bus (hereinafter referred to as trunk-line bus) serving as the trunk line of the on-vehicle LAN conforming to a standard such as a real-time Ethernet (registered trademark) capable of accomplishing high-speed communication.

The on-vehicle database distribution nodes 4 are connected with a plurality of the electronic control units 2 by means of buses (hereinafter referred to as CAN bus) 8 of the on-vehicle LAN network conforming to the CAN to allow input and output of the attribute value data D (Da, Db, . . . ) among the electronic control units 2.

Each on-vehicle database distribution node 4 has an Ethernet communication means 10, which is an example of the on-vehicle LAN communication means, connected with the trunk-line bus 5 to input and output various data; a CAN communication means 11, which is an example of an input/output means, connected with the ECU 2 via the CAN bus 8 to input and output various data; a memory 12 for recording data in the on-vehicle data base 7; and a control means 13.

Because the trunk-line bus (on-vehicle LAN network) 5 of the first embodiment is the bus of the single segment on-vehicle LAN conforming to the real-time Ethernet, it is unnecessary to provide the trunk-line bus 5 with a gateway and thus possible to shorten a delay period of time.

But the trunk-line bus 5 may be constructed of a plurality of segments connected with one another by a gateway.

In the present invention, the construction of the on-vehicle LAN networks 5, 8 are not limited to the bus type, but may be of a star type, a ring type, a mesh type, and the like. In addition, various types such as a loop type and a relay type may be used. The trunk-line bus 5 may be formed of MOST and D2B utilizing optical communication, types which execute communication conforming to IDB1394 and IEEE1394 (registered trademark), and in addition LAN for industrial use and FlexRay.

As shown in FIG. 2, at least identification information ID (IDa, IDb . . . ) of the data D(Da, Db . . . ) and the data D(Da, Db . . . ) corresponding to the identification information ID are recorded in the on-vehicle data base 7. The on-vehicle data base 7 is stored in the memory 12 disposed inside each on-vehicle database distribution node 4. The on-vehicle database system 1 is so managed by the on-vehicle-data base synchronizing program Pa that the on-vehicle data bases 7 disposed inside the on-vehicle database distribution nodes 4(4a, 4b . . . ) respectively are synchronized with one another.

In the first embodiment, as the identification information ID, "wheel speed" or the like is shown. This is to facilitate the description of the present invention. Actually the identification information ID may consist of the value of the fixed number of bits. Similarly a value having a unit affixed thereto is shown as the attribute value data Da . . . . This does not mean that the information having a unit affixed thereto must be included in the attribute value data Da, . . . recorded in the on-vehicle data base 7 of the present invention.

The Ethernet communication means 10 includes a bus driver (not shown) directly connected with the trunk-line bus 5 to send and receive electric signals and a communication controller (not shown) controlling communication conforming to the real-time Ethernet by using the bus driver.

When the trunk-line bus 5 is used to execute optical communication, the Ethernet communication means 10 is appropriately altered. For example, an optical receiving/sending unit is provided as the Ethernet communication means 10.

Similarly the CAN communication means 11 has a CAN transceiver and a CAN controller. When the on-vehicle LAN such as a LIN is used at the connection portion between the ECU 2 and the on-vehicle database distribution node 4, a communication means and a communication controller conforming to the LIN are necessary as the input/output means 11. When the on-vehicle LAN is not used at the connection portion between the ECU 2 and the on-vehicle database distribution node 4, an interface can be formed as the input/output means 11. In this case, the ECU 2 serves as a control portion, provided at the side of the sensor 6, for constructing the means for outputting the data D.

The memory 12 consists of a RAM having a construction which allows the control means 13 to read and write. As the memory 12, it is preferable to use a storing means for holding a stored content by using a back-up power supply, even when a power supply is stopped or use a storing means such as a nonvolatile flash memory which can be rewritten. Output timing setting tables Ta through Tc (when differentiation is unnecessary, output timing setting table is hereinafter referred to as merely output timing setting table T) set by the output timing setting program Pc and used by a data output program Pb are recorded inside the memory 12 of each of the on-vehicle database distribution nodes 4a through 4c. In the first embodiment, because the output timing setting table T, . . . is dynamically set by the output timing setting program Pc, it is necessary that the memory 12 for storing the output timing setting table T therein can be rewritten. But the output timing setting table T, . . . may be fixedly set. In this case, the memory 12 for recording the table T, . . . therein may consist of a ROM.

The control means 13 of the first embodiment is so constructed that the control means 13 is capable of executing the on-vehicle data base synchronizing program (on-vehicle database synchronizing means) Pa for synchronizing the on-vehicle data bases 7 with one another among the on-vehicle database distribution nodes 4a through 4c, the data output program (data output means) Pb outputting the attribute value data D inside the on-vehicle database 7 to the ECU 2 requiring the attribute value data D; and the output timing setting program Pc (output timing setting means) for setting the output timing of the attribute value data D.

The control means 13 executes the on-vehicle database synchronizing program Pa. Thereby when the data Da, Db, . . . are inputted to the control means 13 via the CAN communication means 11, the attribute value data corresponding to the data Da, Db, . . . is registered in the on-vehicle database 7 disposed inside the memory 12 so that the ECU updates the attribute value data Da, Db, . . . . The altered attribute value data Da, Db, . . . are sent to the trunk-line bus 5 respectively via the on-vehicle LAN communication means.

The data Da, Db, . . . may be sent to the trunk-line bus 5 each time the data Da, Db, . . . are inputted to the control means 13 from the ECU 2a, 2b, . . . respectively via the CAN communication means 11. But the on-vehicle database distribution node 4 may be so constructed that newest data Da, Db, . . . may be sent to the trunk-line bus 5 only when the data Da, Db, . . . inputted to the control means 13 from the ECU 2a, 2b, . . . respectively are different (namely, only when there is a change) from the attribute value data recorded in the on-vehicle data base 7 by comparing them with each other. Thereby it is possible to prevent wasteful communication of data having no change and decrease the communication load factor of the trunk-line bus 5 and further synchronize the on-vehicle data bases 7 with one another at almost a real time on the data Da, Db, . . . which have changed.

When the attribute value data Da, Db, . . . is received from other on-vehicle database distribution node 4 via the trunk-line bus 5 and the Ethernet communication means 10, the received attribute value data Da, Db, . . . are registered in the on-vehicle data base 7 by executing signal processing based on the on-vehicle data base synchronizing program Pa. Thereby the attribute value data Da, Db, . . . can be synchronized with one another.

The attribute value data Da, Db, . . . may be synchronized with one another for each on-vehicle data base 7. That is, the control means 13 executes the on-vehicle data base synchronizing program Pa and monitors the attribute value data Da, Db, . . . inside the on-vehicle data base 7. When the values of the attribute value data Da, Db, . . . change during the monitoring, the control means 13 may record the attribute value data which has changed in the value thereof and may send them together to the trunk-line bus 5 periodically. Thereby the trunk-line bus 5 can be efficiently used. Further it is possible to divide the synchronization of the on-vehicle data base 7 into periodical synchronization which is executed according to the kind of the data D and synchronization which is executed when the data D, . . . inputted from the ECU 2 to the control means 13 via the CAN communication means 11 changes. Thereby the trunk-line bus 5 can be more efficiently used.

The control means 13 executes the data output program Pb. Thereby by using the attribute value data inside the on-vehicle data base 7, the data Da, Db, . . . can be outputted to each ECU 2 . . . at a timing required thereby. That is, in the first embodiment, the data output program Pb (or control means 13 executing the data output program Pb) is the concrete construction of the data output means.

The control means 13 executes the data output program Pb. Thereby based on the output timing setting table T inside the memory 12, the data D can be outputted at a timing required by the ECU 2. When a real-time output demand Ra is inputted to the control means 13 from each ECU 2, the data D of the specified identification information ID inside the on-vehicle data base 7 is outputted to the CAN bus 8 in response to the real-time output demand. The real-time output demand Ra includes the identification information ID for identifying the data D indicating the demand for the real-time output.

In the first embodiment, the control means 13 executes the output timing setting program Pc. Thereby an output demand Rb is inputted to the control means 13 from each ECU 2. In response to the output demand Rb, the output timing setting tables Ta, Tb, . . . inside each on-vehicle database distribution node 4 can be dynamically updated. It is preferable that the output demand Rb includes the identification information ID for identifying the data D setting the output timing, the output timing set value and a parameter for determining the output timing.

FIG. 3 shows an example of the output timing setting table T (particularly, output timing setting table Tc recorded in the memory 12 inside the on-vehicle database distribution node 4c) in the on-vehicle database system 1 shown in FIG. 1. Recorded in the output timing setting table T are the identification information ID (each identification information ID is expressed by using reference symbols Ida, Idb, . . . ) of the attribute value data D(Da, Db, . . . ), an output timing Ti (each timing set value is expressed by using reference symbols Tia, Tib, . . . ) of the attribute value data Da, Db, . . . corresponding to the identification information ID, and a parameter Par (each parameter is expressed by using reference symbols Para, Parb, . . . ) of the sending timing of each of the attribute value data Da, Db, . . . .

In the example shown in FIG. 3, regarding the data Da indicating the "wheel speed" as the identification information Ida, the output timing Tia is set to "output at change time", and the parameter para is set to "thinning is not executed". Therefore, the control means 13 executes the data output program Pb to output the data D, . . . at a timing based on the output timing setting table Tc. Thereby the data Da can be outputted to the CAN bus 8 at a timing required by the ECU 2i. That is, when the attribute value data Da inside the on-vehicle data base 7 is updated, the data Da can be outputted to the CAN bus 8 disposed at the side of ECU 2h, 2i, . . . (see FIGS. 1, 2).

When the output at the change time is set in the output timing setting table T without executing thinning, the ECU 2i is capable of receiving the data Da from the ECU 2a at a real time except a slight delay required in the synchronization of the on-vehicle data base 7. Further when there is no change in the measured value of the wheel speed, it is possible to prevent the output of meaningless data Da by not outputting the data Da to the CAN bus 8.

It is possible to set the output timing Ti to a "real-time output" and output the data D to the CAN bus 8 each time the data is inputted to the control means 13 from the ECU 2, even though the value of the data D does not change. Thereby the ECU 2 at the data supply side and the ECU 2 at the data receiving side are capable of sending and receiving the data D in a directly connected sense without being conscious of the interposition of the on-vehicle data base 7 therebetween.

Conversely, it is possible to set the output timing Ti to "outputs at predetermined intervals" and output the data D to the ECU 2 at the data receiving side by executing the thinning of the updated data D from each ECU 2 at the data supply side to some extent. In this case, by setting the receiving time interval of the data D required by the ECU 2 at the data receiving side as the parameter Par, the ECU 2 at the data receiving side is capable of receiving the data D at a necessary interval (for example, at an interval of one second as shown by parameter Parc in FIG. 3). Thereby it is possible to greatly reduce the execution of wasteful communication by using the CAN bus 8.

As shown in the example of FIG. 3, "output at time in excess of threshold" may be set as the output timing Tib. In this example, the output at a time in excess of the threshold is set on the data Db indicating the "steering angle" as the identification information IDb, and the threshold is set to "every ±5 degrees" in the parameter Parb. That is, the control means 13 executes the data output program Pb. Thereby with reference to the output timing setting table Tc, the data Db can be outputted to the CAN bus 8 at intervals of five degrees or the like in the steering angle. This is the output timing required by the ECU 2i.

As described above, in the on-vehicle database system 1 of the present invention, the attribute value data D in the on-vehicle database 7 is sent as the data D at the timing required by each ECU 2. Therefore the resource of each ECU 2 is not wastefully consumed. In addition, the ECU 2 is capable of receiving the necessary data D at the required timing without wastefully increasing the communication load factor of the CAN bus 8 or the like. Therefore even though the number of logical connections between each ECU 2 and other electronic control units 2 is large, it is possible to make a proper control without being subjected to an unnecessary stress.

As the output timing Ti, the "output at change time", the "output at time in excess of threshold", and the "output at predetermined interval" are disclosed in the output timing setting table Tc shown in FIG. 3. As described above, the "real-time output" can be set. These expressions are to facilitate the description of the present invention. The present invention is not limited to the above-described set values. But actually the set value of the output timing is preferably a numerical value or a symbol. Similarly needless to say, regarding the parameter Par, the above description is not an important element.

In the first embodiment, the on-vehicle database synchronizing means Pa, the data output means Pb, and the output timing setting means Pc are implemented when the control means 13 executes a software. But these means Pa through Pc may be constructed of a hardware. In this case, by so constructing the control means 13 that the output timing setting means Pc sets the output timing required by each ECU 2 in the output timing setting table T in response to the output demand Rb from each ECU 2 and that the data output means Pb outputs the data D according to the output timing setting table T, each ECU 2 is capable of receiving the necessary data D, . . . demanded thereby at a necessary timing.

That is, like so-called "plug-and-play", the ECU 2 of the on-vehicle database system 1 is capable of sending and receiving necessary data D with the ECU 2 connected logically with a large number of the electronic control units 2 without being conscious of the construction of the connection between the ECU 2 and the other electronic control units 2.

Figure 4:
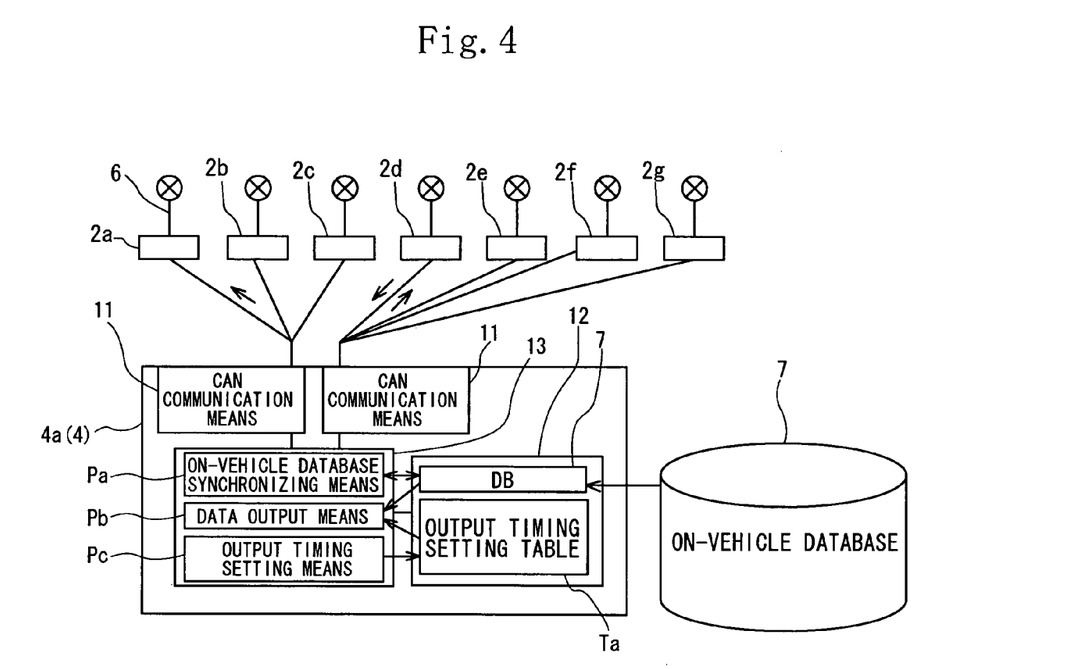
FIG. 4 shows the construction of an on-vehicle database system of a second embodiment of the present invention.

FIG. 4 shows the second embodiment.

In the first embodiment, a plurality of the on-vehicle database distribution nodes 4a through 4c is connected with one another via the on-vehicle LAN network. On the other hand, in the second embodiment, the on-vehicle database distribution nodes are connected with one another not via the on-vehicle LAN network but via a plurality of the electronic control units 2 (2a through 2g) and a communication line. The on-vehicle database distribution node 4 of the second embodiment is not necessarily provided with the input/output means, connected with other on-vehicle database distribution nodes, which is necessary in the first embodiment, but is provided with a data input/output means connected with the electronic control units 2a through 2g to send data thereto and receive data therefrom.

The other constructions of the on-vehicle database distribution node 4 are similar to the construction of the on-vehicle database distribution node of the first embodiment. Therefore the same parts of the on-vehicle database distribution node of the second embodiment as those of the on-vehicle database distribution node of the first embodiment are denoted by the same reference numerals as those of the on-vehicle database distribution node of the first embodiment, and description thereof is omitted herein.

Even though a large number of the electronic control units 2 is connected with one another via the on-vehicle database distribution node 4, it is possible to register data outputted from the ECU 2a to the on-vehicle database distribution node 4 in the database and output the data required by other ECU 2g at a necessary timing. That is, the electronic control units 2a through 2g connected with the on-vehicle database distribution node 4 are easily capable of obtaining data from the ECU connected with the on-vehicle database distribution node by connecting the electronic control units 2a through 2g with one on-vehicle database distribution node 4 constituting the on-vehicle database system without being conscious of the state of communication between the electronic control units 2a through 2g and the ECU (ECU at data supply side) constituting the data output source and without being conscious of the on-vehicle LAN network for connecting the ECU at the data supply side and the electronic control units 2a through 2g with each other.

What is claimed is:

1. An on-vehicle database distribution system including an on-vehicle LAN network configured to connect each of a plurality of on-vehicle database distribution nodes, the plurality of on-vehicle database distribution nodes being configured to connect to a plurality of electronic control units, each of the plurality of on-vehicle database distribution nodes comprising:

a first input/output device that is configured to input data thereto from a first electronic control unit and a second electronic control unit of the plurality of electronic control units connected therewith and that is configured to output the data to the first and second electronic control units of the plurality of electronic control units;

a memory that is configured to register the data inputted thereto from the first and second electronic control units of the plurality of electronic control units in an on-vehicle database as attribute value data;

a data output device that is configured to selectively output the data to the first electronic control unit of the plurality of electronic control units at a timing required thereby by using the attribute value data registered in the on-vehicle database as a result of the data being inputted to the memory from the second electronic control unit of the plurality of electronic control units, the first electronic control unit of the plurality of electronic control units being different from the second electronic control unit of the plurality of electronic control units;
an on-vehicle LAN communication device that is configured to send and receive the attribute value data via the on-vehicle LAN network;
a second input/output device that is configured to input data from other on-vehicle database distribution nodes of the plurality of on-vehicle database distribution nodes and that is configured to output data from the other on-vehicle distribution nodes of the plurality of on-vehicle database distribution nodes; and
an on-vehicle database synchronizing device configured to: (1) record the attribute value data corresponding to data inputted thereto via the input/output device in the on-vehicle database inside the memory, (2) send the attribute value data through the on-vehicle LAN network via the on-vehicle LAN communication device, and (3) register attribute value data in the on-vehicle database, under the condition that the on-vehicle database synchronizing device receives the attribute value data from the on-vehicle LAN network via the on-vehicle LAN communication device.

2. The on-vehicle database distribution system according to claim 1, wherein
the memory includes: an output timing setting table having identification information for identifying the attribute value data to be outputted and a data output timing indicating when the data based on the attribute value data is to be outputted, and
each of the plurality of on-vehicle database distribution nodes further includes an output timing setting device configured to input output demands from each of the plurality of the electronic control units via the first input/output device and configured to update the output timing setting table in accordance with the output demands.

3. The on-vehicle database distribution system according to claim 2, wherein the data output timing is a timing indicating when a specified attribute value data changes; and
under the condition that a change is detected in the specified attribute data during monitoring of the on-vehicle database, the data output device immediately outputs data based on the specified attribute value data.

4. The on-vehicle database distribution system according to claim 2, wherein the data output timing is a timing indicating when a specified attribute value data exceeds a predetermined threshold; and
under the condition that the specified attribute data exceeds the predetermined threshold exceeds during monitoring of the on-vehicle database, the data output device immediately outputs data based on the specified attribute value data.

5. The on-vehicle database distribution system according to claim 1, wherein the data output device of each of the plurality of on-vehicle database distribution nodes is configured to input real-time output demands from each of the plurality of electronic control units via the first input/output device and is configured to immediately output the data in response to the real-time output demands.

6. The on-vehicle database system according to claim 1 comprising:
a communication device configured to connect the plurality of on-vehicle database distribution nodes and the plurality of electronic control units with each other,
wherein the data received from each of the plurality of electronic control units connected with one of an on-vehicle database distribution node of the plurality of on-vehicle database distribution nodes is registered in the on-vehicle database of the one of the on-vehicle database distribution node of the plurality of on-vehicle database distribution nodes, and the communication device is configured to output the data to each of the plurality of electronic control units connected to other on-vehicle database distribution nodes of the plurality of on-vehicle distribution nodes.

7. An on-vehicle database system according to claim 1, wherein
the data received from the plurality of electronic control units connected with the plurality of on-vehicle database distribution nodes, respectively, is registered in the on-vehicle database; and
the data output device is configured to output the data to each of the plurality of electronic control units.

* * * * *